United States Patent
Capello et al.

(10) Patent No.: US 11,409,709 B1
(45) Date of Patent: Aug. 9, 2022

(54) CLOUD-NATIVE GLOBAL FILE SYSTEM WITH FILE ACCELERATOR

(71) Applicant: Nasuni Corporation, Boston, MA (US)

(72) Inventors: John A. Capello, Cambridge, MA (US); Aaron T. Binford, McHenry, IL (US); Chinmaya Kanth Gogineni, Holliston, MA (US); David T. Mandile, Boston, MA (US); Russell A. Neufeld, Newton Highlands, MA (US); Toby C. Patterson, Watertown, MA (US); David M. Shaw, Newton, MA (US)

(73) Assignee: Nasuni Corporation, Boston, MA (US)

( * ) Notice: Subject to any disclaimer, the term of this patent is extended or adjusted under 35 U.S.C. 154(b) by 0 days.

(21) Appl. No.: 17/214,342

(22) Filed: Mar. 26, 2021

(51) Int. Cl.
| | |
|---|---|
| *G06F 16/178* | (2019.01) |
| *G06F 16/176* | (2019.01) |
| *G06F 16/17* | (2019.01) |
| *G06F 16/18* | (2019.01) |

(52) U.S. Cl.
CPC ........ *G06F 16/178* (2019.01); *G06F 16/1734* (2019.01); *G06F 16/1774* (2019.01); *G06F 16/1873* (2019.01)

(58) Field of Classification Search
USPC ........................................................ 707/610
See application file for complete search history.

(56) References Cited

U.S. PATENT DOCUMENTS

| | | | | |
|---|---|---|---|---|
| 5,909,594 | A * | 6/1999 | Ross | H04L 47/245 710/20 |
| 6,611,848 | B1 * | 8/2003 | Bradley | G06F 16/1767 707/690 |
| 6,633,870 | B1 * | 10/2003 | Bradley | G06Q 10/10 |
| 6,687,716 | B1 * | 2/2004 | Bradley | G06F 16/1767 707/822 |
| 7,280,481 | B2 * | 10/2007 | Rong | H04L 45/12 370/238 |
| 8,037,476 | B1 * | 10/2011 | Shavit | G06F 9/526 718/104 |
| 9,053,167 | B1 * | 6/2015 | Swift | G06F 16/27 |
| 10,311,153 | B2 * | 6/2019 | Mason, Jr. | G06F 16/1827 |
| 2001/0032282 | A1 * | 10/2001 | Marietta | G06F 15/17 710/200 |
| 2003/0165160 | A1 * | 9/2003 | Minami | H04L 69/161 370/466 |
| 2005/0138112 | A1 * | 6/2005 | Sagar | H04L 69/329 709/203 |

(Continued)

*Primary Examiner* — Cam Linh T Nguyen
(74) *Attorney, Agent, or Firm* — David H. Judson

(57) ABSTRACT

A cloud native global file system is augmented to include a "file accelerator" that is configured to speed up data propagation with respect to updates on a shared volume and, in particular by performing real-time analysis on audit event data to coordinate pushes and pulls across multiple edge appliances, effectively replacing static snapshot and synchronization schedules. A "push" refers to a snapshot on the volume that occurs at a particular filer, and a "pull" refers to a synchronization (sync) operation initiated by a particular filer to obtain whatever is in the cloud (and that is the subject of the pull). The file accelerator operates in several modes of "triggered" operation based on user activity, and under the control of a cloud-based controller.

19 Claims, 6 Drawing Sheets

(56) References Cited

U.S. PATENT DOCUMENTS

| | | | |
|---|---|---|---|
| 2007/0128899 A1* | 6/2007 | Mayer | G06F 21/568 439/152 |
| 2010/0223359 A1* | 9/2010 | Runstedler | H04L 67/06 709/219 |
| 2011/0126099 A1* | 5/2011 | Anderson | H04L 63/08 715/704 |
| 2012/0263159 A1* | 10/2012 | Moeller | H04L 47/00 370/338 |
| 2016/0026406 A1* | 1/2016 | Hahn | G06F 3/0656 711/103 |
| 2016/0246816 A1* | 8/2016 | Abi | G06F 16/148 |
| 2017/0004083 A1* | 1/2017 | Jain | G06F 12/0868 |
| 2020/0341752 A1* | 10/2020 | Lim | G06F 11/3604 |

\* cited by examiner

CLOUD-NATIVE GLOBAL FILE SYSTEM WITH FILE ACCELERATOR

BACKGROUND OF THE INVENTION

Technical Field

This application relates generally to data storage.

Background of the Related Art

It is known to provide a cloud-native global file system that is used to provide primary file storage for enterprise data. In this approach, edge appliances (or "filers") typically located on-premises securely transmit all files, file versions and metadata to a preferred private or public cloud object store, while locally caching only active files. The appliances are stateless, and multiple appliances can mount the same volume in the cloud. As files are written locally, an authoritative copy of every file and metadata (inodes) are stored in the cloud. The system provides a single, unified namespace for all primary file data that is not bound by local hardware or network performance constraints. The above-described approach to enterprise file services also has been extended to provide multiple-site/multiple-filer access to the same namespace, thereby enabling participating users with the ability to collaborate on documents across multiple filers/sites. Major cloud platforms, e.g., Amazon® AWS, Microsoft® Azure, Google® Cloud and others, are then utilized as a write-once, read many object store for the enterprise primary file data, which is typically stored in volumes. A solution of this type is available commercially from Nasuni® Corporation of Boston, Mass.

In a multi-site shared volume often one or more files must be pushed from a source filer to one or many target filers that share the volume. In this context, the operator of the source filer must be able to determine when those files have arrived at the targets. In this operating scenario, there is a desire to reduce data propagation time, especially with respect to directories that are under a global file lock across a set of filers that share the volume.

BRIEF SUMMARY

According to this disclosure, a cloud native global file system is augmented to include a "file accelerator" that is configured to speed up data propagation with respect to updates on a shared volume and, in particular by performing real-time analysis on audit event data to coordinate pushes and pulls across multiple edge appliances, effectively replacing static snapshot and synchronization schedules. As used herein, a "push" refers to a snapshot on the volume that occurs at a particular filer, and a "pull" refers to a synchronization (sync) operation initiated by a particular filer to obtain whatever is in the cloud (and that is the subject of the pull). The file accelerator operates in several modes of "triggered" operation based on user activity, and under the control of a cloud-based controller. The first mode is a triggered push (or snapshot), which is a mode in which a particular filer of the set of filers sharing the volume is prioritized (over the other filers) for a push. A push occurs with respect to the entire volume and moves data and metadata off of the particular filer and into the cloud object store. Once the push completes, the other filers of the set of filers sharing the volume then need to obtain that data and metadata; to this end, the second mode of triggered operation (and which is the opposite of the triggered push) is then a triggered pull, whereby the data and metadata that was the subject of the triggered push get pulled to the other filers that share the volume. In this embodiment, the filers are not operating under a global file lock (GFL). Each filer has a local service running that checks-in with the controller periodically (e.g., every five (5) seconds) to query whether the controller has a new "recommendation" to either push or pull. Once a filer receives a recommendation from the controller to initiate a triggered push, it does so. Once the filer completes the push on the volume, the controller thereafter responds to queries from the other filers with a recommendation to pull. In this manner, each of the other filers merge its respective local cache to the latest version of the volume.

Which one of the filers (in the set that share the volume) is identified for the push depends on a prioritization scheme that determines a current "highest priority filer." This determination is made by the controller which continuously receives event data from each of the filers, and then uses a scoring mechanism to determine which of the filers of the set should then be prioritized for receiving the push recommendation. The scoring mechanism is turned on (activated) for the filers upon occurrence of a particular event, namely, a volume lock release event that has occurred at a filer. When the controller receives an indication that the volume lock release event has occurred, it sets or re-sets the scoring mechanism and begins computing scores for the filers based on the event data that is thereafter received by the controller. As the received event data is analyzed and scored, a highest priority filer is identified, and the controller provides the push recommendation to that controller when queried.

According to a further feature, and when a directory is operated under a global file lock (GFL), the controller may provide a filer a pull recommendation to "fast sync" the directory.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
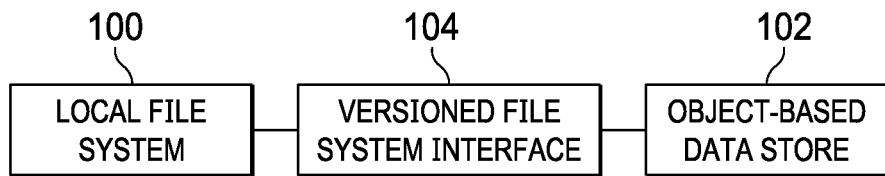
FIG. 1 is a block diagram illustrating how a known versioned file system interfaces a local file system to an object-based data store.

FIG. 1 illustrates a local file system 100 and an object-based data store 102.

Although not meant to be limiting, preferably the object-based data store 102 is a "write-once" store and may comprise a "cloud" of one or more storage service providers. An interface 104 (or "filer") provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e., a storage system internal to an enterprise), an external storage cloud, or some combination thereof.

The interface 104 may be implemented as a machine. A representative implementation is the Nasuni® Filer, available from Nasuni® Corporation of Boston, Mass. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
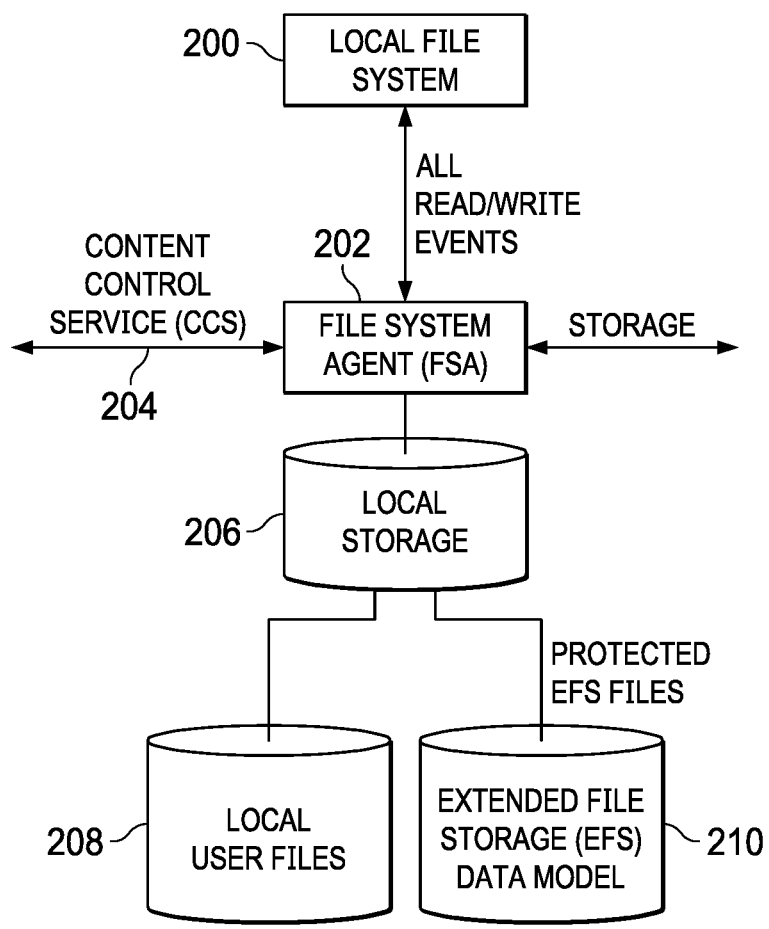
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
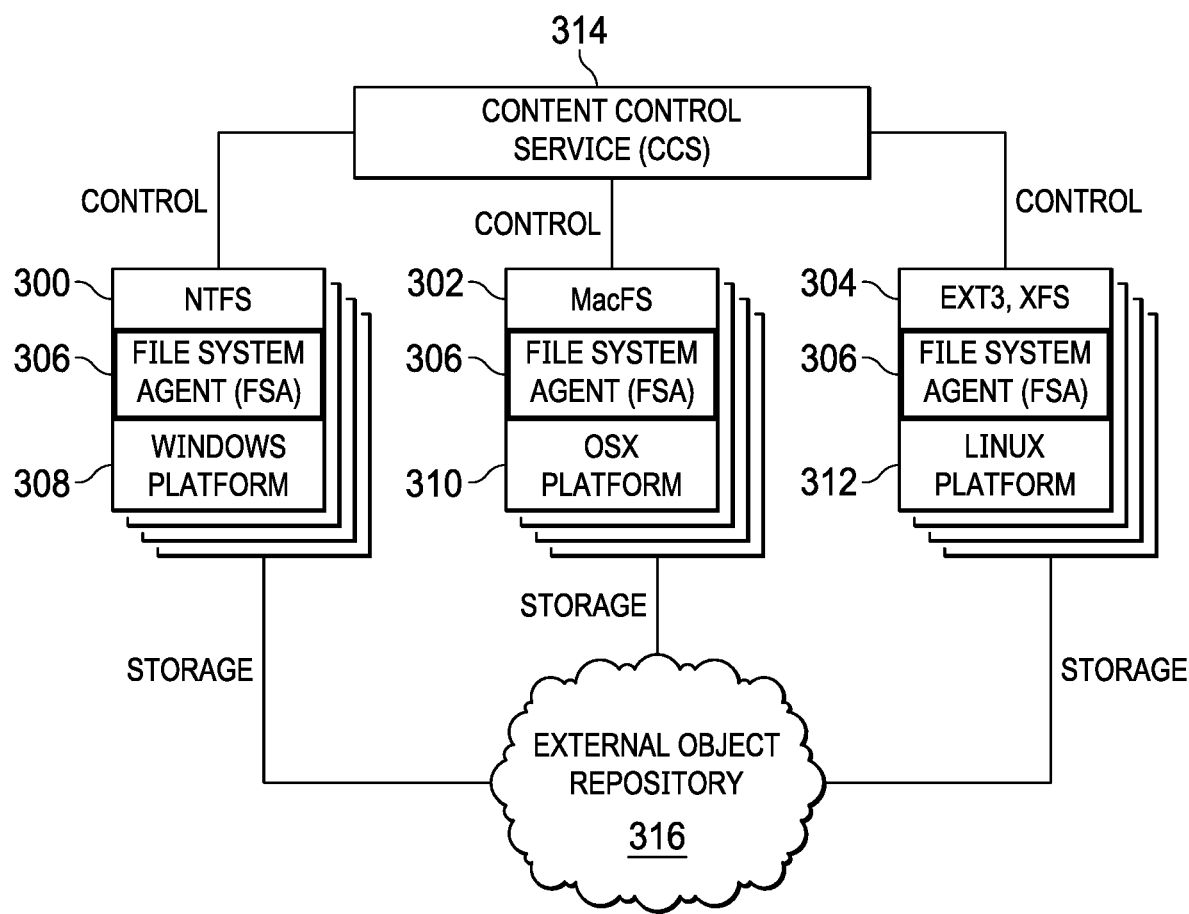
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are representative, and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
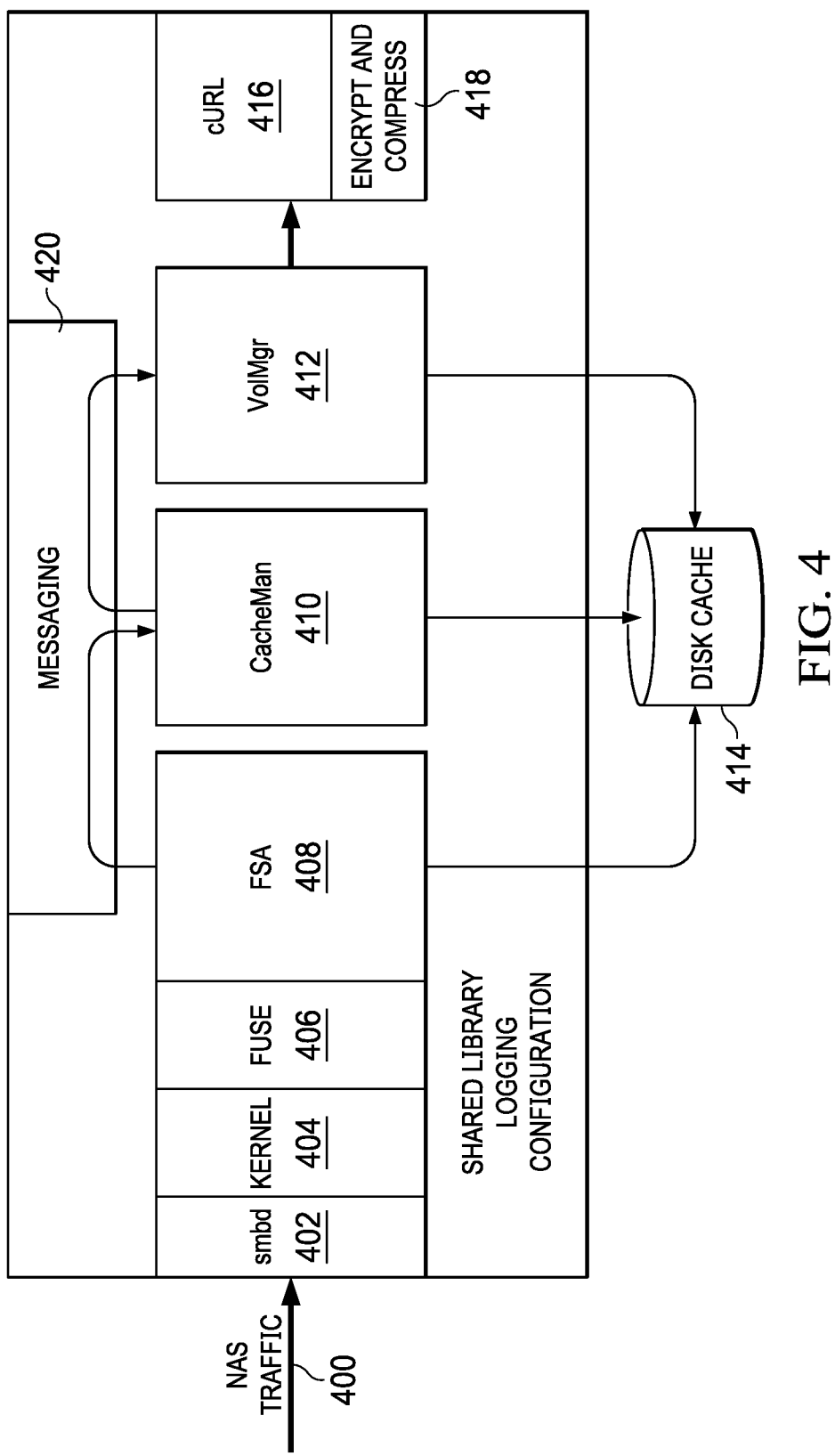
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

For more details concerning the filer as described above, the disclosure of U.S. Pat. No. 9,575,841 is hereby incorporated by reference.

Figure 5:
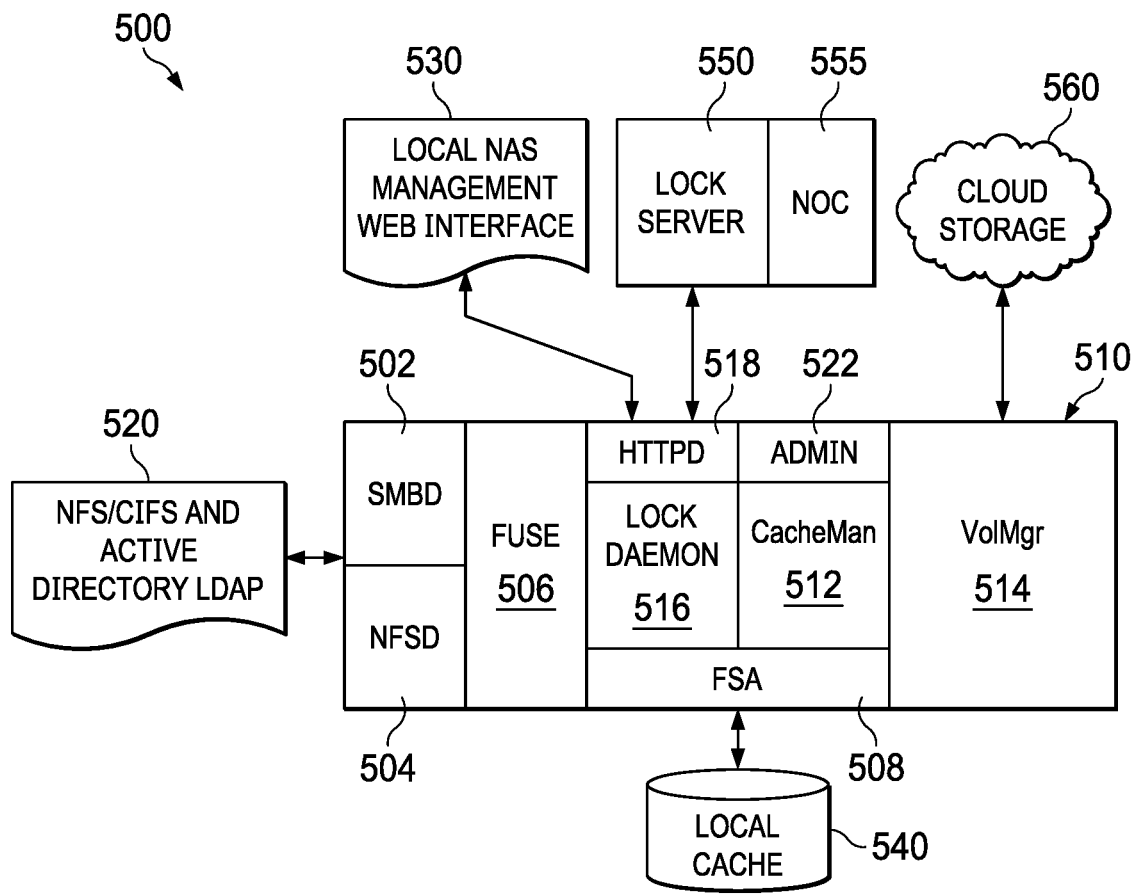
FIG. 5 depicts a versioned file system that implements global locking.

FIG. 5 is a block diagram that illustrates a system 500 for managing a versioned file system (as described above) that also includes the capability of global locking. The system 500 includes an interface 510 in communication with local traffic 520, a web-based portal 530, a local cache 540, a lock server 550, and cloud storage 560. The interface 510 includes a SMBD layer 502, a NFSD layer 504, a FUSE module 506, a FSA 508, a cache manager 512, a volume manager 514, a lock daemon 516, a transport layer 518, and an administrative module 522. In some embodiments, the interface 510 is the same as the interface described with respect to FIG. 4 but with the addition of the lock daemon 516.

SMB/CIFS lock requests are intercepted by SMBD layer 502, which is a SAMBA file server daemon. An optional Virtual File System (VFS) module can extend the SAMBA server daemon to send the local lock information to the FSA 508. FSA 508 then communicates with FUSE 506 to coordinate the FUSE file descriptors (pointers) with the ioctl information to determine a path for the given file(s) associated with the lock request. Assuming a path is enabled for global locking, FSA 508 sends the lock and path to the lock daemon 516, which handles the lock request as described below. If a path is not enabled for global locking, the lock request stays within the SAMBA server as it did previously (e.g., conflict management, etc. as described above) and it is not sent to the lock daemon 516.

NFS lock requests are passed through the NFSD layer 504 to FUSE 506. Assuming a path prefix is enabled for global locking, FSA 508 communicates with the lock daemon 516 to handle the lock request using a common protocol, as described above. If the path prefix is not enabled for global locking, FSA 508 handles the lock request as it did previously (e.g., conflict management, etc. as described above) and the lock request is not sent to the lock daemon 516.

The lock daemon 516 is responsible for local lock management and coordinating with the global lock server. The lock daemon 516 can perform one or more of the following functions: (a) translating the lock format; (b) communicating with the centralized lock server; (c) acquiring locks; (d) lock peeking; (e) lock re-acquiring; (f) lock releasing; and (g) communicating with the filer.

With respect to translating the lock format, the lock daemon 516 can translate the local file lock requests to a common lock format understood by the centralized lock server 550 (described below). Using this approach, the lock server 550 receives a lock request in one format regardless of the underlying network protocol (e.g., SMB/CIFS or NFS). The centralized lock server 550 can be in a network operations center (NOC) 555.

The lock daemon 516 can then communicate with the centralized lock server 550 by making calls to a Centralized Lock API. Through the API, the lock daemon 516 can execute a lock request, an unlock request, and/or a lock break request. A lock request generally requires the transmission of certain information such as the first handle (a unique identifier to the original base object for the file), the requested lock mode, the file path, the protocol of the requester, etc. Additional information such as timestamps and serial number can be included in the lock request. The requested lock mode is the type of access for the lock, such as a shared or exclusive lock, a lock for read, a lock for write, lock for exclusive write, lock for shared write. If the centralized lock server 550 grants the lock request, the lock server 550 then uses information provided in the lock request (e.g., the first handle) to retrieve the latest version of the requested file from cloud storage 560. The centralized lock server 550 transmits the latest version of the requested file to the lock daemon 516, which can store the file in local cache 540.

An unlock request can include the same or similar information as the lock request but with an updated handle name that was generated as a result of modifications to the locked file. A lock break request can be provided by a system administrator to manually unlock a file (e.g., if a user leaves a locked file open overnight, a server goes down, etc.).

Prior to making a new lock request, the lock daemon 516 determines whether a lock already exists in local cache 540 or on the centralized lock server 550. If no lock exists in either of those locations, the lock daemon 516 acquires a new lock through the centralized lock server 550. The new lock can have a lock mode computed using the requested access and share profiles (masks).

Lock peeking can be initiated every time a file is opened for read. In lock peeking, the lock daemon 516 can query whether a lock exists on the file prior to opening the file. If a lock exists, the lock daemon 516 can also determine the associated lock mode to evaluate whether the lock mode permits the user to open the file. The lock daemon 516 retrieves this information from local lock cache 540 if the filer requesting the lock peek already has a write lock on the file. Otherwise, the lock daemon 516 retrieves this information from the centralized lock server 550. Each lock peek request can be cached in the local lock cache 540 for a short time period (e.g., several seconds) to reduce traffic to the central lock server 550 if the lock daemon 516 receives a new lock peek request shortly after the first lock peek request.

For example, another user may have a lock for exclusive write access to the file that does not allow any shared access (i.e., no shared read access). In this example, the lock daemon 516 determines from the lock query that the file cannot be opened due to an existing lock on the file. In another example, the lock mode can allow shared read or write access in which case the lock daemon 516 determines from the lock query that the file can be opened.

During lock peeking, the lock daemon 516 can also retrieve additional information about the file, such as the file handle, handle version, first handle, and lock push version. The file handle is a pointer to the latest version of the file in the cloud. The handle version is a version of the file in the cloud. The first handle provides a unique identifier to the file across versions and renames of the file. The lock push version is the latest version of the file that was sent to the cloud.

The lock daemon 516 can cache locks and unlocks in a local lock cache 540 for release to the centralized lock server 550. If a lock request is made for a file that has a cached unlock request, the lock can be reestablished without having to acquire a new lock from the centralized lock server 550. In such a situation, the unlock request is cancelled. This caching can reduce load on the lock server 550 and improve response time. In general, the unlock requests are cached for a certain period of time prior to release to the lock server 550 to allow for such lock reestablishment.

As discussed above, the lock request includes information on the protocol (e.g., SMB/CIFS or NFS) of the requester and the lock mode. The lock server 550 receives this information and can determine, based on any existing lock(s) on the requested file, whether the lock server 550 can issue multiple locks on the same file. The lock server 550 can evaluate the protocol used by the requester of the existing lock and the associated access/share permissions of that lock and determine whether protocol used with the new lock requester is compatible.

In addition, the lock daemon 516 handles lock releases. In some embodiments, the lock daemon 516 does not immediately send the lock release to the lock server 550. This time delay can reduce load on the centralized lock server 550 because files are frequently locked and unlocked in rapid succession, as discussed above. Before a lock is released, if the file was changed, the current data is sent to cloud storage 560 (e.g., Amazon S3, Microsoft Azure, or other public or private clouds) so the most recent data is available to the next locker.

Finally, the lock daemon 516 can communicate with the FSA 508. The lock daemon 516 can receive lock requests and/or lock peek requests from FSA 508, which the lock daemon 516 translates into a common protocol for transmission to the centralized lock server 550, as discussed above. The lock daemon can also pass the updated handle name to the FSA 508 to perform a file-level snapshot before unlocking a file and/or a file level merge/synchronization before locking a file.

For global locking, it is desirable for the locker to have the most recent version of the file associated with the lock request (and lock grant). To accomplish this, the cache manager 512 can be configured to snapshot a single file (e.g., the file associated with the lock request) without triggering a copy-on-write (COW) event (which would cause a version update, as discussed above) and without affecting other snapshot operations. After a single file snapshot, the cache manager 512 can mark all parent directories of the file as changed or "dirty." In addition, the fault manager algorithm can be configured to fault a single file based on requests from the FSA 508.

The merge/push algorithm can be modified to provide for merging single files. Before the locked file is pushed to the local cache 540, the NOC 555 assigns a unique lock version (e.g., 64 bit) to the file. The lock version can be used by FSA 508 to determine whether a locked file or its metadata is dirty (i.e., changed). The parent directories of the locked file can continue to use the existing write version assigned from the last TOC. Thus, FSA 508 can track two values: lock_write_version and lock_push_version. When a file or directory is dirtied, the lock_write_version is updated. When a file or directory is pushed to local cache 540, the lock_push_version is updated.

As discussed above, the file data from the NOC 555 (or centralized lock server 550) is merged into the local cache 540 before the FSA 508 returns control of the file to the client. To determine if the file data in the NOC 555 is newer than the file data in the cache 540 (e.g., if the lock is retrieved while an unlock request is cached), the FSA checks MAX (lock_write_version, lock_push_version) against the NOC lock version. If the NOC lock version is greater than the lock_write_version and the lock_push_version, the file data (object metadata and data) from the NOC 555 is used to instantiate the object (locked file) in the local cache 540.

If the file data in the cache 540 is newer, then the file data from the NOC 555 is discarded. In the circumstance where the NOC 555 indicates that the file is deleted, the delete version is compared to the local cache 540 version in order to apply the delete to the local cache 540.

In addition, the merge/push algorithm can be modified to reconcile the single-file merges of locked files with the snapshot merges of files. Any file that was "fast synced" through the FSA 508 (i.e., locked) or "fast pushed" to the cloud (i.e., unlocked) is designated as "cloud fast synced." When merging an object or file that is considered "cloud dirty" or "cloud fast synced," the FSA 508 will update the file if the incoming lock_push_version is greater than MAX (lock_write_version, lock_push_version), as discussed above. If the incoming lock_push_version is less than MAX (lock_write_version, lock_push_version), the cache object is considered newer, and the incoming update is discarded by the FSA 508. Also, when a file is missing (deleted) from the pushed version, but the file is also locally fastsynced, the file will not be deleted. This merging can occur concurrently or before the global lock on the file is granted.

In addition, if a file has been deleted or renamed, the local cache metadata can record a "delete tombstone" which includes certain information (e.g., parent first handle, lock version, name, etc.). FSA 508 merges a file as new if the file is newer than any delete tombstone contained in the cache for the unique file. This can address the situation in which a file has been fast synchronized before merge. In that case, the incoming cloud dirty file is old compared to the cache and the import is discarded.

To ensure that the unlocked file includes the changes from the latest version, the locked file can only be unlocked when the lock_push_version is greater than or equal to the lock_write_version at which point the FSA 508 sends the lock_push_version back to the NOC 555 (or centralized lock server 550) to store the new version of the file in cloud storage 560.

In some embodiments, the interface 510 snapshots and merges new files at the time of creation. The new file requests can be stored on the lock server 550 with the lock entries. Other users can poll the lock server 550 to determine if new files/objects exist that have not yet been populated to the cloud 560, for example if there are new files/objects in a given directory. After the new files have been created, the locker server 550 can merge the new file requests into the appropriate directories in the cloud 560.

The following provides further details regarding "sharing" in the context of a multi-site implementation. This technique is described in U.S. Pat. No. 8,661,063, the disclosure of which is hereby also incorporated by reference. As used herein, "sharing" refers to the ability to provide full read/write access at any time to any file/folder/volume owned by a particular filer, or across multiple such filers. According to this approach, independent volumes are enabled to share data in the cloud.

Consider the case of two (2) filers that desire to do full read/write sharing of a single volume, where each of the filers uses an interface and creates a VFS as has been described above. In particular, Filer A has Volume-RW, and Filer B has Volume'-RW. Users of Filer A read and write Volume-RW as a normal file system, and users of Filer B read and write Volume'-RW as a normal file system. This type of operation has been described above. Now, according to the "sharing" technique, filers first register into a sharing group. Preferably, a web-based interface (or the like) is provided for this purpose, although any other convenient sharing group registration mechanism may be used. The registration interface includes or is associated with appropriate authentication and/or authorization mechanisms to ensure privacy and security, and that entities desiring to "share" independent volumes can manage their sharing appropriately. (Filers may also de-register from a sharing group using the web-based interface). At a start of each snapshot, a filer that has registered for a sharing group is provided (e.g., by the service provider or otherwise) a "snapshot lock" that includes its version number. By definition, during this lock no other filers can snapshot. Once the version is acquired, the filer that acquires the lock does the following: (i) the filer first looks at delta lists (attached to TOCs, and as described in more detail below) from the last version this filer pushed to the current version, and then applies all changes to its current file system; (ii) the filer then begins pushing to the cloud; and (iii) completes the push. In the alternative, instead of using delta lists, the filer can compare file system metadata (directories, structures, and so forth). When using file system compare, portions of the directory tree may not need to be compared, e.g., if there are common elements between or among the sides being merged.

During the push (i.e., as all chunks and the file manifests, etc. are being pushed), optionally a notification is sent to all other members of the sharing group notifying them of new/changed files. In the embodiment where notification is used, the message typically includes only the cloud handle for the file manifest; other information (e.g., the GUID of the filer that wrote the file, the path of the file in the namespace, etc.) can be learned from this manifest. Preferably, the sending filer only has to send once, and the notification message is replicated into a persistent message queue for each other filer in the sharing group. (Preferably, each filer in the sharing group has an associated message queue, although this is not a limitation).

Once notified, each other filer in the sharing group performs the following: if the version of the object is greater than its own version, the other filer inserts the new/changed file into its "now" current file system, e.g., using a fast restore algorithm. If the version of the object is less than its own version, the other filer ignores the update.

During the snapshot, the filer doing the snapshot gets bundles (associated with each TOC) from the cloud for each version between its last snapshot and the current snapshot and that contains metadata about the items changed during the snapshot. Such metadata (sometimes referred to as a delta list) may include: path names, access control lists (ACLs), and handles. A delta list may be attached to each TOC that indicates what changes since the last TOC. Preferably, the deltas (differences) between the versions are merged into the current snapshot sequentially. A new delta frame is created and tied into the new TOC in connection with completing the snapshot operation.

As an optimization, changes may be streamed to the cloud when snapshotting is not occurring to improve sharing response time.

The above-described techniques provide the ability to share independent volumes that are established by distinct filers. This conserves storage space in the cloud, does not require the use of shadow volumes, does not require snapshots to alternate between or among filers, facilitates near-live sharing of files even before a snapshot is complete, maintains synchronous snapshot of file system capability, and enables multiple volumes to have independent histories without twice the data being persisted in the cloud.

The filers may be anywhere geographically, and no network connectivity between or among the filers is required (provided filers have a connection to the service).

More generally, sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise, though practical limitations (e.g., security) can dictate whether multiple enterprises can share access to a common file system. This enables partners to share the file system (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

The above-described services platform consolidates an enterprise's Network Attached Storage (NAS) and file server silos in cloud storage, delivering infinite scale, built-in backup, global file sharing, and local file server performance. A commercial implementation of these technologies is a software-as-a-service (SaaS) platform is available from Nasuni Corporation. Enterprise customer data is stored on one or more third party clouds in a write-once, read-many (WORM) manner in a platform-specific format, namely, UniFS®-formatted volumes. This solution provides NAS consolidation, backup and recovery modernization, multi-site file sharing, and rapid, infrastructure-free disaster recovery, while also serving as a foundation for data analytics and multi-cloud IT initiatives in a manner that is now described.

File Accelerator

With the above as background, the techniques of this disclosure are now described.

As will be seen, a main goal of the file accelerator solution herein is to speed up data propagation (typically, during the sharing process) and, in particular by performing real-time analysis on audit event data to coordinate pushes and pulls across multiple edge appliances, effectively replacing static schedules. For the following description, it is assumed that multiple filers are sharing a volume stored in a private, public or hybrid cloud object store. As used herein, a "push" refers to a snapshot on the volume that occurs at a particular filer, and a "pull" refers to a synchronization (sync) operation initiated by a particular filer to obtain whatever is in the cloud (and that is the subject of the pull). Pull is a unidirectional operation that is a command for the filer to merge its local cache to the latest version of the file system. Generally, pull is the opposite of push.

Figure 6:
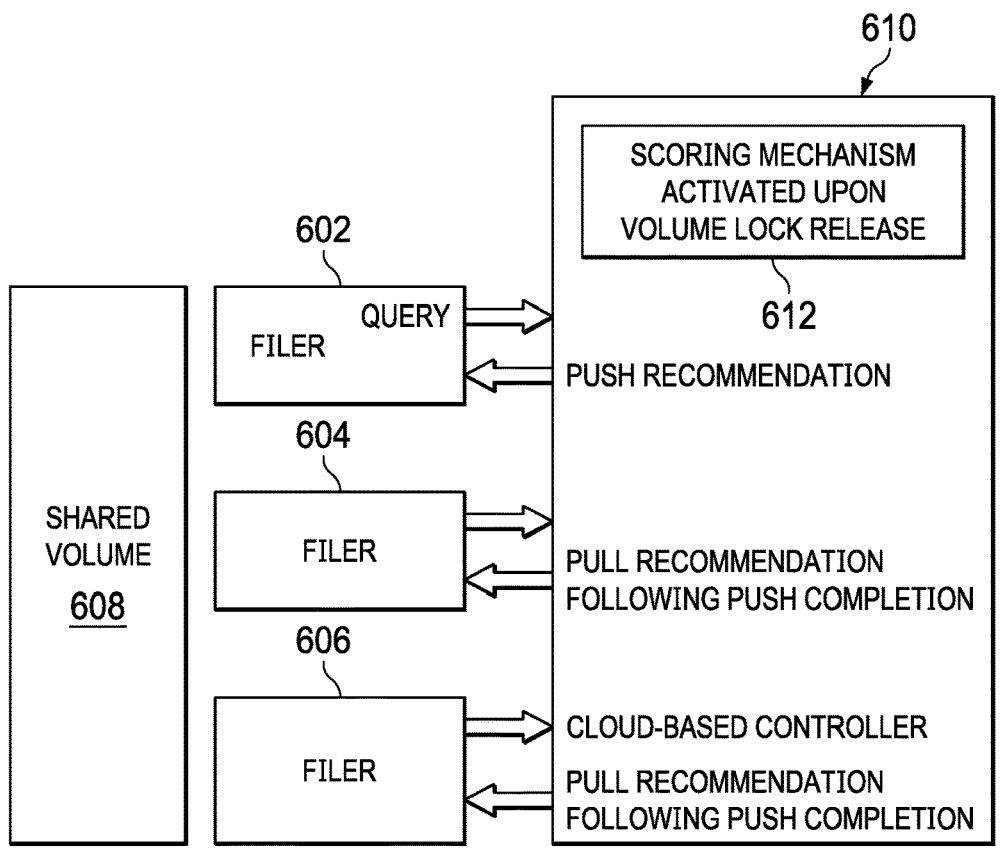
FIG. 6 depicts a set of filers being managed by a controller that issues triggered push and pull recommendations to the filers.

According to this disclosure, the file accelerator operates in several modes of "triggered" operation based on user activity, and under the control of a cloud-based controller. The first mode is a triggered push (or snapshot), which is a mode in which a particular filer of the set of filers sharing the volume is prioritized (over the other filers) for a push. A push occurs with respect to the entire volume and moves data and metadata off of the particular filer and into the cloud object store. Once the push completes, the other filers of the set of filers sharing the volume then need to obtain that data and metadata; to this end, the second mode of triggered operation (and which is the opposite of the triggered push) is then a triggered pull, whereby the data and metadata that was the subject of the triggered push get pulled to the other filers that share the volume. FIG. 6 depicts the triggered push and pull operations for a set of filers 602, 604 and 606 with respect to the shared volume 608. In this embodiment, the filers are not operating under a global file lock (GFL). Each filer 602, 604 and 606 has a local service running that checks-in with the controller 610 periodically (e.g., every five (5) seconds). In particular, the filer checks-in with the controller to query whether the controller has a new "recommendation" to either push or pull. The filers typically query the controller asynchronously from one another, but once a filer (such as filer 602) receives a recommendation from the controller 610 to initiate a triggered push, it does so. Once filer 602 (in this example) completes the push on the volume, the controller thereafter responds to queries from filers 604 and 606 with a recommendation to pull. In this manner, each of the filers 604 and 606 merge its respective local cache to the latest version of the volume. As will be described below, which one of the filers (in the set that share the volume) is identified for the push depends on a prioritization scheme that determines a current "highest priority filer." This determination is made by the controller 610, which continuously receives event data from each of the filers, and then uses a scoring mechanism 612 to determine which of the filers of the set should then be prioritized for receiving the push recommendation. The scoring mechanism is turned on (activated) for the filers upon occurrence of a particular event, namely, a volume lock release event that has occurred at a filer. When the controller receives an indication that the volume lock release event has occurred, it sets or re-sets the scoring mechanism and begins computing scores for the filers based on the event data that is thereafter received by the controller. As the received event data is analyzed and scored, a highest priority filer is identified, and the controller provides the push recommendation to that controller when queried.

Push is a scarce resource, and as noted it is usually rescored when a volume lock has been released. With respect to an update to a particular version in the versioned file system, preferably only one recommendation to push is awarded at one time. That said, triggered push/pull operations may still be interleaved across the filer set. In other words, assume filer 602 executes the triggered push on the volume with respect to version 100 (V100) of the versioned file system, and (once the push completes) the filers 604 and 606 execute the associated triggered pull on that volume (and V100), as previously described. In this time period, and depending on when the volume lock release event has occurred, filer 604 may receive a separate push recommendation with respect to a next version V101 of the versioned file system that it is updating. That push, in turn, may cause the controller to issue the triggered pulls (for V101 updates) to filers 602 and 606. In other words, the particular triggered push and the related triggered pulls need not operate in a mutually exclusive manner.

As mentioned, the above-described processing is enabled for filers sharing a volume but that are not operating under global file lock. When filers are operating under GFL, another mode of triggered operation—triggered fast sync—may be implemented by the controller. In this mode, the controller instructs a filer to sync individual directories to the latest versions of the contents within them. In other words, triggered fast sync is implemented with respect to one or more directories of the volume, as opposed to the volume as a whole. In one embodiment, triggered file sync is initiated by the controller for the filers under GFL when it receives event data indicating that a new file is created on a particular filer while unique users are also showing up in the directory on the other filers. While this is a typical use case for triggering fast sync, this mode may also be triggered for other activity such as file delete, file write, directory create, directory delete, etc. When triggered fast sync is enabled, and as part of sending audit events to the controller, the controller notes when a change occurs in a directory that is global file lock (GFL)-enabled. When this change gets reported, it also causes an immediate re-score of the prioritized list being maintained for the push recommendation.

The notion of a "recommendation" is not intended to imply that the filer that receives the recommendation can ignore it. The recommendation(s) provided by the controller to the individual filers sharing the volume are instructions to take the identified action (namely, push or pull, as the case may be), and the filers take such actions when instructed by the controller to do so.

In operation, and as described, each filer is configured to periodically check-in with the cloud-based controller (e.g., every five (5) seconds) to determine whether the cloud-based controller has any recommendation(s) for the filer. To this end, the cloud-based controller continuously receives user activity event data from the filers, and it executes the prioritization scheme based on the user activity. The prioritization scheme is carried out relative to a directory in which updates (e.g., reads, writes, deletes, creates, etc.) are happening on a filer. As updates occur, the cloud-based controller receives the event data and keeps track of what file or directory-related activity is of most "interest" to users. A typical heuristic indicative of user "interest" is a simple count of the number of unique users waiting for a file. Other types of heuristics may be used for the prioritization scheme associated to the directory. Using the prioritization scheme, and based on user activity at the filers, the cloud-based controller determines which filer of the set of filers should have priority for the push recommendation. The cloud-based controller then proactively provides the recommendation to the highest-priority filer as determined by the relevant interest heuristic and the user activity. By implementing triggered push (snapshot) in this manner, data is propagated across the filers reliably and much more quickly as compared to using static push and pull schedules.

Figure 7:
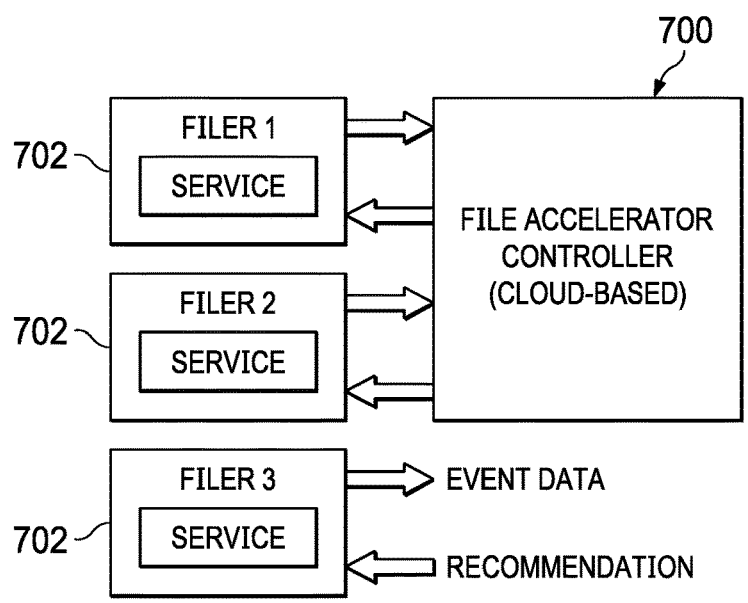
FIG. 7 is another depiction of the file accelerator solution according to this disclosure.

As depicted in FIG. 7, the file acceleration solution herein comprises two basic components: a file accelerator controller 700, and a file accelerator service 702. As described above, the file accelerator controller 700 comprises cloud-based infrastructure that analyzes audit events and coordinates push and pull activity among appliances sharing a volume. The file accelerator service 702 executes on an edge appliance (one of the appliances sharing the volume) to send events to the cloud and receive recommendations to push (the triggered push mode) and pull (the triggered pull mode when the filers are not operating under GFL, and the triggered fast sync mode when the filers are operating under GFL). The file accelerator service 702 on the edge appliance executes recommended actions, and it includes the capability to recover from system and network problems. The cloud-based file accelerator controller 700 analyzes audit events sent from an appliance (in particular, the file accelerator service 702 running on an appliance), e.g., hashed directory names, numeric or UUID user names, and file extensions. Preferably, and to preserve confidentiality of customer data, file, directory and user name information is obfuscated before leaving the appliance. As previously described, triggered push or pull operations herein operate independently of scheduled push/pull activity, as such scheduled activity often does not provide sufficient data propagation speeds. Stated another way, when triggered push and pull for the shared volume are enabled for file acceleration, the scheduled push/pull for that volume are disabled, although the scheduled push/pull for other volumes typically continues to operate.

As noted, the file accelerator controller 700 recommends pushes and pulls based on certain actions on one appliance, e.g., directory and file creates, deletes, renames, etc., as well as actions in the same directory on other appliances. A representative push operating scenario (with the described sequence of ordered operations) thus may proceed as follows, assuming three filers (filer 1, filer 2 and filer 3 that are sharing the volume): (1) user 1 on filer 1 creates directory B under directory A in volume 1; the audit event is sent to the cloud; (2) users on filer 2 and filer 3 cd into directory A on volume 1; the audit events are sent to the cloud; (3) the file accelerator controller 600 detects this behavior and marks volume 1 for push on filer 1; (4) filer 1 calls its associated file accelerator controller service 602 and learns it should push volume 1; (5) filer 1 pushes volume 1; and (6) filers 2 and 3 will soon sync changes via a pull, which occurs as a by-product of the filer service. Thus, the propagation of directory B to filer 2 and to filer 3 is accelerated. While this is a typical use case, even in the absence of collaborative behavior, push recommendations may also be awarded based on general wire activity, time since the last push, and other considerations.

Figure 8:
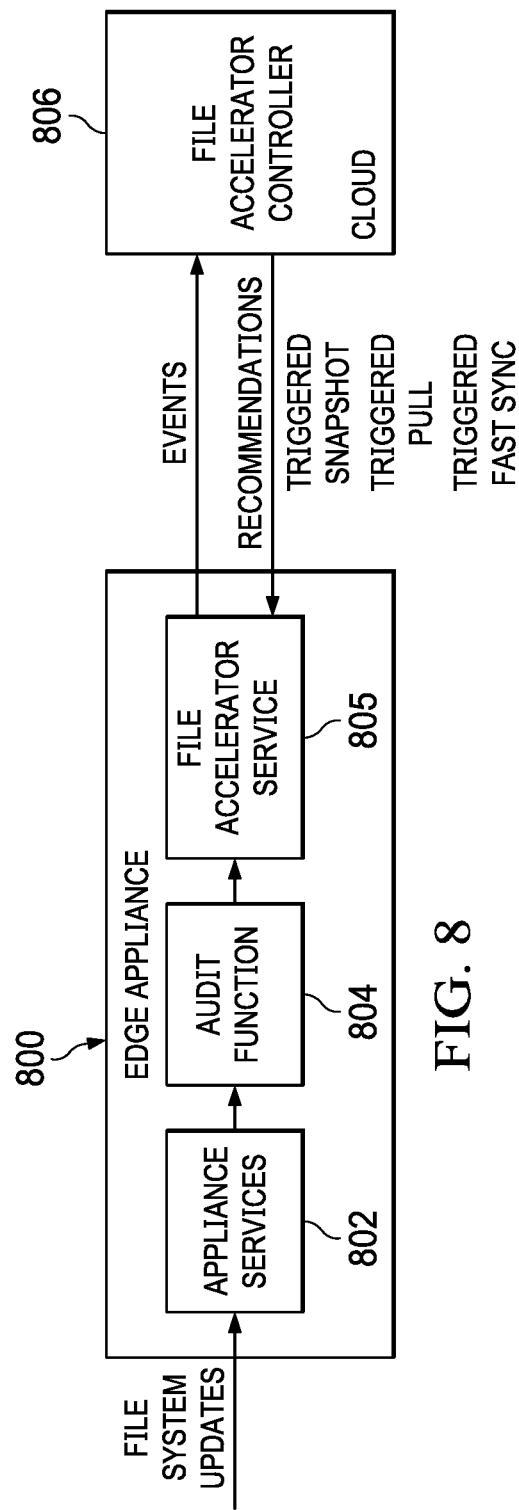
FIG. 8 depicts additional details regarding the file accelerator.

FIG. 8 depicts the file acceleration solution of this disclosure in additional detail. As depicted, an edge appliance 800—such as depicted in FIG. 4 and described above—comprises a set of local appliance services 802 that receive and process file system updates. The appliance services 802 provides information to an audit component 804. The appliance 800 further includes a file accelerator service 805 of this disclosure coupled to the audit component 804 and that is responsible for dispatching filtered audit events to and executing recommendations (e.g., push, pull) from the remote cloud-based file accelerator controller 806. In one embodiment, the file accelerator service 805 is implemented as a Python-based service. It provides a set of features, preferably with respect to a single selected volume per account under file accelerator control. In this manner, and excepting the volume affected, other volumes in the system are unaffected, i.e., they continue to use standard push and pull schedules. A volume that is managed for file acceleration ("FA" or global (G)FA) according to this disclosure is sometimes referred to as "FA- (or GFA-enabled) volume."

In operation, the file accelerator service 805 reads audit events from the audit component 804, performs transformation (e.g., hashing and filtering), and then sends the event data to the file accelerator controller 806. In particular, the data sent to the file accelerator controller 806 should be hashed to prevent sensitive information from being accessible to the service provider or any bad actor. In one non-limiting embodiment, this is accomplished by one-way hashing directory paths. For example, if an audit log contained the file/dir1/dir2/dir3/file .txt, the data sent to the cloud would be hash (/dir1/dir2/dir3). As noted above, the service 805 also provides triggered snapshot and fast sync. In particular, preferably appliances using the file accelerator solution do not use standard push and pull (snapshot and sync) schedules configured by the service provider (e.g., in a management component (MC)); instead, the file accelerator service 805 running on the edge appliance 800 receives instructions (recommendations) from the file accelerator controller 806 about specific actions to take. As noted above, the filer's file accelerator service 805 is configured by default to check-in with the controller on a regular cadence to determine if it push or pull. This polling not required, as the controller may provide this information to the file accelerator services proactively. In the event the service 805 running on the local edge appliance loses communication with the file accelerator controller 806, the service 805 fails over to emulate the scheduled push and pull as configured on the volume by the management component.

The file accelerator service is started when a new configuration is received by the edge appliance. A post-config hook script may be used for this purpose. Preferably, cronjobs for push and pull are not created for the GFA-enabled volume, as such activity would cause create lock contention and potentially minimize the benefits of running the file acceleration service. On the MC, preferably the user is provided a notification (e.g., a banner) indicating that changes to push and pull schedules for the GFA-enabled volume will not take effect, although the user is still permitted to change the schedules. API calls to obtain volume push locks preferably indicate the source of the lock, especially if the reason for requesting lock is the local FA service calling push.

In an example implementation, the file accelerator controller 806 (for the associated set of local files and their file acceleration service(s)) is configured as an endpoint in the cloud, behind which is the infrastructure enabling its capabilities. In one embodiment, endpoints are implemented in a public cloud service (e.g., Amazon® AWS® or Microsoft® Azure® or others) and provide multi-tenancy, high-availability, and cross-region failover for disaster preparedness. The file accelerator controller typically is implemented in the same public, private or hybrid cloud environment (the cloud object store) that supports that versioned file system exported by the filers. In Amazon AWS, for example, the controller infrastructure is implemented using a gateway component (e.g., API Gateway), a serverless compute component (e.g., Lambda), and a backend database (e.g., Aurora MySQL).

In operation, preferably, the file accelerator controller 806 exposes a single endpoint by which data sent by edge appliances is ingested and recorded for scoring, which facilitates the dynamic triggering functionality according to the configured prioritization scheme for the directory that is maintained and enforced by the controller. As noted, preferably scoring is triggered when the controller 806 is notified (e.g., by a Network Operations Center (NOC)) that a volume lock has been released. As noted above, according to this disclosure a particular prioritization scheme is configured to enforce a user activity "interest" heuristic. Based on the heuristic (e.g., a number of unique users waiting for a particular file), the scoring then determines which one of the filers should receive a push recommendation. In other words, according to a preferred approach, the push recommendation is awarded to the filer with a highest score (i.e., need). When a highest scoring filer than receives the push recommendation, its local file accelerator service executes the push with respect to the volume.

Thus, according to the file accelerator solution, user activity on the filers is continuously provided to the cloud-based controller. The file accelerator service running on the edge appliances receives and acts on recommended actions, but preferably all decision-making resides in the cloud-based controller.

Preferably, a web-based interface is available to make available to permitted users information about how the file accelerator solution is functioning for a given customer and volume. For example, the interface may display push and event data on a volume, details about recommendations, scores and other diagnostic data, and an input form to enable a user to inquire about activity for a given file or directory across all appliances. Further, the controller interface may be alerted based on information sent from the appliance to the controller, such as: problems executing recommendations, metrics, and other errors and exceptions. Preferably, infrastructure issues can be detected and reported using cloud tools (e.g., AWS CloudWatch) and custom health checks. The solution may also be integrated with external monitoring and alert tools.

Preferably, the file accelerator controller stores data sent to it by the edge appliances, including timestamps of audit events as well as timestamps for calling pull. A propagation time may then be defined, e.g., as the time delta between a write-like audit event happening, and the other edge appliances pulling down the file change from the audit event. With this on-the-fly calculation of data propagation time, the system can collect ordinal statistics from which mathematical operations on data can then be performed (e.g., by filer, by volume, time range, and the like).

Because preferably all file, directory and user name information are obfuscated before leaving the appliance, the cloud does not have direct access to the customer's data. Nevertheless, it is possible for a determined attacker to monitor an interest in a file or directory associated with some hash value. For example, if an attacker repeatedly sees a hash such as 498b1046f2c01f3e29de47313c14f22, it may assume that the customer is doing a lot of work on the file, even though it does not know what data is in the file. Plain hashes also are vulnerable to dictionary and rainbow table attacks where a large text corpus is hashed to provide a list of hashes hat can be compared to a given target hash to reveal the original data. To provide further security, the hash might be salted by adding random data to the data being hashed (e.g., hash(RANDOM|foobar)), but—even then—a particular hash will still be the same across all systems and for an indefinite time period; while this does make a dictionary or rainbow table attack more difficult, the use of a static, and therefore known, salt does not fully avoid these attacks, as it is still possible (albeit more labor intensive) to leverage these attacks while incorporating the salt. A better solution is to use rotating salted hashes, wherein (as the name implies) the salt for each hash is rotated. If the salt rotation period is short enough, there may not be time to create the dictionary or rainbow table in the first place. Further, because the hashes change every salt rotation period, there is no way for an attacker to build up the necessary records of what makes a hash interesting. At worst, the attacker could determine how interesting a given hash is for the salt rotation period.

To rotate a hash, the system needs to know the amount of time that a record is useful/interesting to the system. Preferably, the rotating salt hash protocol guarantees that a record hash is usable for at least that amount of time (i.e., the lifetime), but never more than some multiple (e.g., double that amount of time). In practice, it will range between lifespan and lifespan*2, averaging to lifespan*1.5. In practice, a double hash scheme is used, one with (time/lifespan) and the other with (time/lifespan)+1. This ensures that even in the worst-case scenario where the hash is generated in the last moments of the lifespan, that the hash is still usable for (at least) a full lifespan. A simple salt of (time/lifespan) is not sufficient, as that can be pre-calculated by the attacker, allowing them to build up a dictionary for a future window of time. Instead, preferably some secret information is included in the hash that even the service provider (more specifically, the NOC) cannot know. The filer-secret can be any piece of information that is already known to all filers sharing a volume but explicitly not known to the NOC. For example, this could be a hash of private MPIs of the volume key for the volume, a simple hash of the volume key itself, etc. Alternatively, the hash itself could be constructed as an HMAC (hashed message authentication code) using these same volume key hashes as the HMAC key.

Preferably, all filers use the same salting method, but the particular details do not impact the protocol from the NOC perspective. The NOC just sees a hash that can be compared, e.g., hash (filer-secret|(time/lifespan)|filename)
hash (filer-secret|(time/lifespan)+1|filename)

When comparing hashes, the NOC needs to check against both of the above. Even though in practice the "+1" will not match the "+0" hash, they are treated equivalently. Alternately, and as noted above, the filer-secret is used as the key for an HMAC. This actually uses the filer-secret as a key to encrypt a hash. Because the NOC does not know the filer-secret, it cannot verify the hash.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described the subject matter herein, what we claim is as follows.

The invention claimed is:

1. A method of data sharing among multiple filers that share a volume of a versioned file system in a private, public or hybrid cloud object store using scheduled push/pull activity on the volume, comprising:

at a controller that is distinct from the multiple filers:
continuously receiving event data from the multiple filers that are configured to share the volume, wherein the event data represents user activity on a filer;
upon receipt of an indication that a volume lock has been released at a given filer, analyzing the event data thereafter received according to a prioritization scheme to determine a highest priority filer; and
responsive to receipt of a query from the highest priority filer, delivering to the highest priority filer a recommendation to initiate a push on the volume to move data off the highest priority filer and into the cloud object store;
wherein the push on the volume occurs independently of the scheduled push/pull activity, thereby reducing data propagation time for the data sharing.

2. The method as described in claim 1 further including:
responsive to completion of the push on the volume by the highest priority filer, and responsive to receipt of a query from at least one other filer, delivering to the one other filer a recommendation to initiate a pull on the volume to pull the data to the other filer independently of the scheduled push/pull activity.

3. The method as described in claim 1 wherein the prioritization scheme is associated with given user activity associated with the directory that has occurred at the highest priority filer, the directory having also been referenced by other user activity on one or more filers other than the highest priority filer.

4. The method as described in claim 1 wherein the highest priority filer is determined according to an interest metric enforced by the prioritization scheme.

5. The method as described in claim 4 wherein the given user activity associated with a filer is a file or directory update and the interest metric is a number of unique users at the one or more filers other than the highest priority filer waiting on a file.

6. The method as described in claim 1 further including disabling the scheduled push/pull activity.

7. The method as described in claim 1 wherein the multiple filers are global file lock (GFL)-enabled.

8. The method as described in claim 7 further including providing at least one filer a recommendation to fast sync one or more directories to latest versions of contents within them.

9. The method as described in claim 1 wherein the event data comprises an entry in an audit log of a given filer and whose directory path is hashed to prevent exposure of sensitive information in the audit log.

10. The method as described in claim 9 wherein a hash associated with the directory path is a salted, rotating hash.

11. The method as described in claim 1 at least one other volume associated with the multiple filers continues to operate under the scheduled push/pull activity.

12. The method as described in claim 11 further including failing back to the scheduled push/pull activity upon loss of communication with respect to a filer.

13. A file accelerator software-as-a-service (SaaS), comprising:
multiple filers that share a volume in a private, public or hybrid cloud object store using scheduled push/pull activity on the volume, each filter comprising a physical or virtual machine;
cloud-based infrastructure comprising at least one computing machine, the computing machine comprising computer memory holding computer program code, the computer program code configured as a controller distinct from the multiple filers to:
  periodically receive from the multiple filers queries for push and pull recommendations;
  continuously receive event data from the multiple filers that are configured to share the volume, wherein the event data represents user activity on a filer;
  upon receipt of an indication that a volume lock has been released at a given filer, analyze the event data thereafter received according to a prioritization scheme to determine a highest priority filer;
  responsive to receipt of a query for a push or pull recommendation from the highest priority filer, deliver to the highest priority filer a recommendation to initiate a push on the volume to move data off the highest priority filer and into the cloud object store; and
  responsive to receipt of a query for push or pull recommendation from at least one other filer, deliver to the at least other filer a recommendation to initiate a pull on the volume to retrieve the data from the cloud object store;
wherein the highest priority filer receives and initiates the recommendation to push the volume;
wherein, following completion of the push, the at least other filer receives and initiates the recommendation to pull the volume;
wherein the push or pull occur independently of the scheduled push/pull activity, thereby reducing data propagation time for data sharing.

14. The file accelerator SaaS as described in claim 13 wherein the highest priority filer is determined according to an interest metric enforced by the prioritization scheme.

15. The file accelerator SaaS as described in claim 14 wherein the given user activity associated with a filer is an update and the interest metric is a number of unique users at the one or more filers other than the highest priority filer waiting on a file.

16. The file accelerator SaaS as described in claim 12 wherein a directory in the volume is global file lock (GFL)-enabled, and wherein the computer program code is further configured to:
  provide at least one filer a recommendation to initiate a fast sync on the directory.

17. A filer apparatus configured to share a volume in a private, public or hybrid cloud object store using scheduled push/pull activity on the volume, comprising:
  a processor;
  computer memory storing computer program code executed by the processor, the computer program code configured to:
    generate event data from an activity occurring on the filer;
    uploading the event data for analysis with event data provided by one or more other filer apparatus that share the volume;
    receiving a recommendation to initiate a push or pull operation, the recommendation having been generated at a controller remotely from the filer apparatus upon a determination at the controller that a directory associated with the filer apparatus is also being referenced by activity on one or more other filer apparatus that share the volume and that involves a given file behavior; and
    independently of the scheduled push/pull activity, initiating the push or pull operation based on the recommendation, thereby reducing data propagation time for data sharing.

18. The filer apparatus as described in claim 17 wherein the program code is further configured to generate the event data by hashing an entry in an audit log.

19. The filer apparatus as described in claim 18 further including applying a salted, rotating hash to the event data.

* * * * *